April 16, 1946.  C. W. LEACH  2,398,541
MOTOR VEHICLE
Filed May 3, 1944  2 Sheets-Sheet 1

INVENTOR.
Carl W. Leach
BY
Victor J. Evans & Co.
ATTORNEYS

April 16, 1946.  C. W. LEACH  2,398,541
MOTOR VEHICLE
Filed May 3, 1944  2 Sheets-Sheet 2
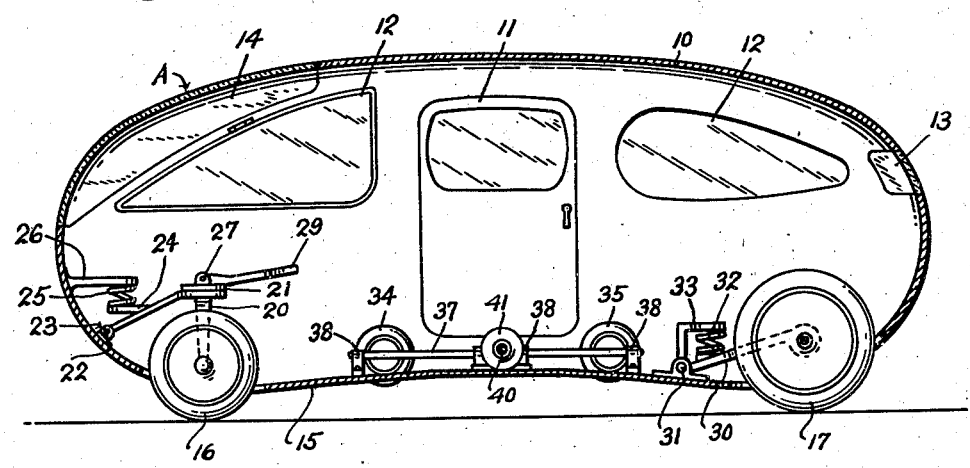
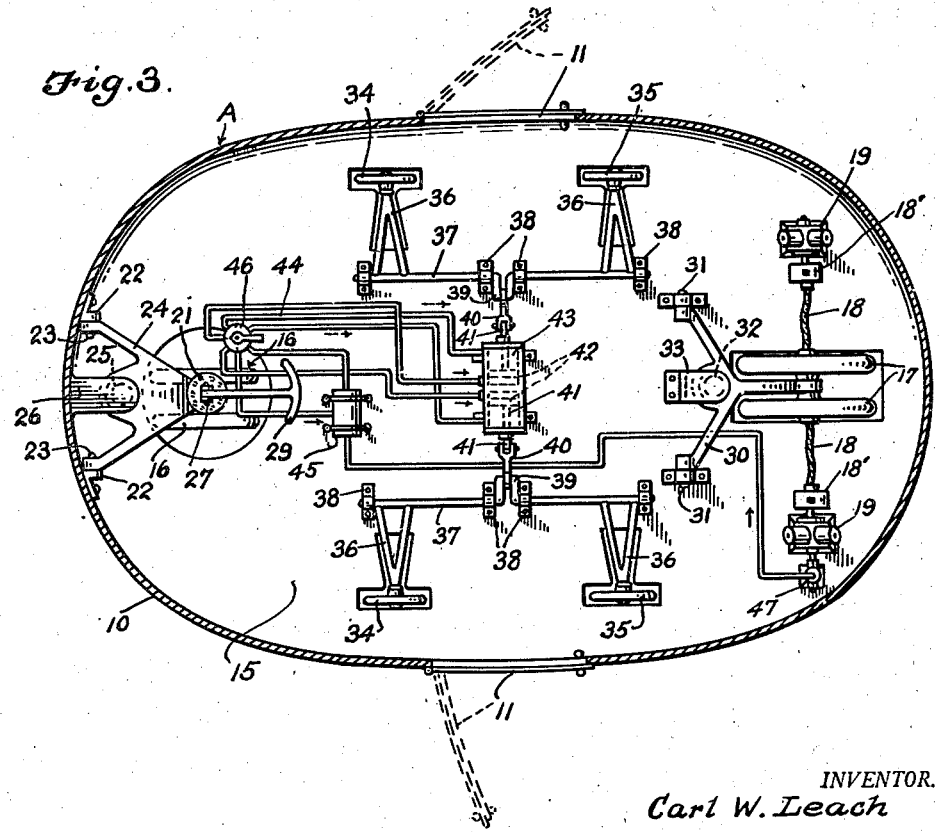
INVENTOR.
Carl W. Leach
BY
Victor J. Evans & Co.
ATTORNEYS Patented Apr. 16, 1946

2,398,541

UNITED STATES PATENT OFFICE 2,398,541

MOTOR VEHICLE

Carl W. Leach, Los Angeles, Calif.

Application May 3, 1944, Serial No. 533,887

1 Claim. (Cl. 180—21)

The invention relates to land vehicles and more especially to motor vehicles.

The primary object of the invention is the provision of a vehicle of this character, wherein the body of the same is arranged with fore and aft wheel, the latter being the driving wheel which are dual in number, while the fore wheel is the steering wheel for the vehicle, and in addition to these wheels there are side wheels which function to keep the vehicle on an even keel, and also lend to safety in the turning of the vehicle at curves in a traveling course.

Another object of the invention is the provision of a vehicle of this character, wherein the aft driving wheels are powered in a unique and novel manner, and the side wheels assure the proper take-off of the vehicle and also when coming to a stand-still or at stand-still position.

A further object of the invention is the provision of a vehicle of this character, wherein the controls for the side wheels is novel, being regulated by the operator of the vehicle, while the fore and aft wheels have associated therewith shock absorbers, to assure comfort and easy riding qualities to the vehicle.

A still further object of the invention is the provision of a vehicle of this character, which is simple in construction, thoroughly reliable and efficient in operation, strong, durable, attractive in appearance, readily and easily controlled and operated, and inexpensive to manufacture.

With these and other objects in view the invention consists in the features of construction, combination and arrangement of parts as will be hereinafter more fully described, illustrated in the accompanying drawings, which show the preferred embodiment of the invention, and pointed out in the claims hereunto appended.

In the accompanying drawings:

Figure 2 is a vertical longitudinal sectional view taken on the line 2—2 of Figure 1 looking in the direction of the arrows.

Figure 3 is a horizontal sectional view through the body of the vehicle.

Similar reference characters indicate corresponding parts throughout the several views in the drawings.

Figure 1:
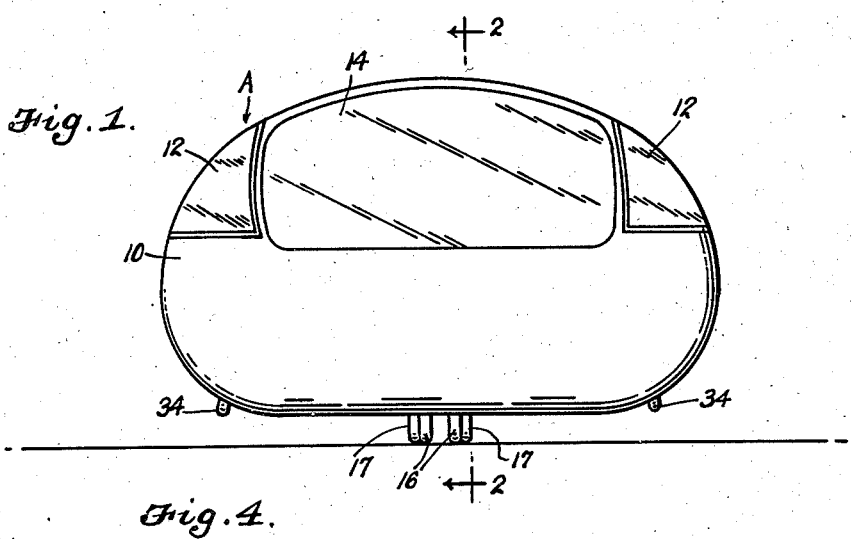
Figure 1 is a rear elevation of the vehicle constructed in accordance with the invention, the side wheel being in raised position.
Figure 4:
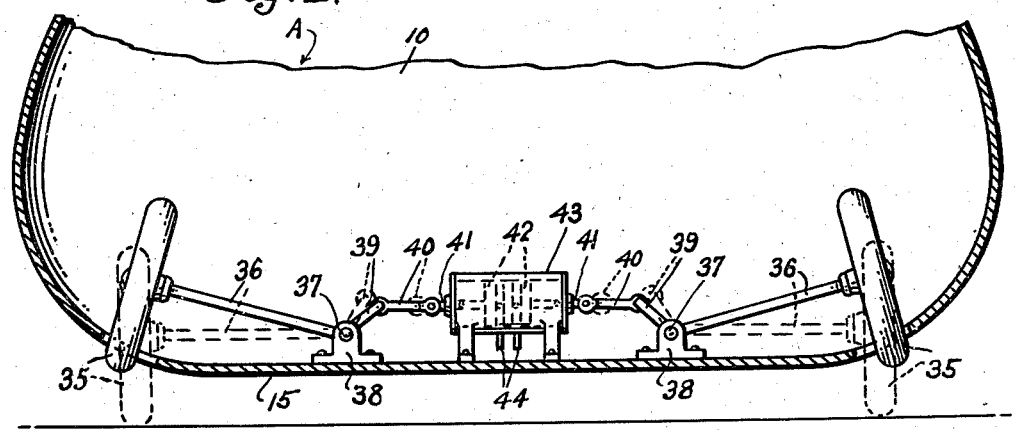
Figure 4 is a fragmentary vertical transverse sectional view thereof.
Figure 5:
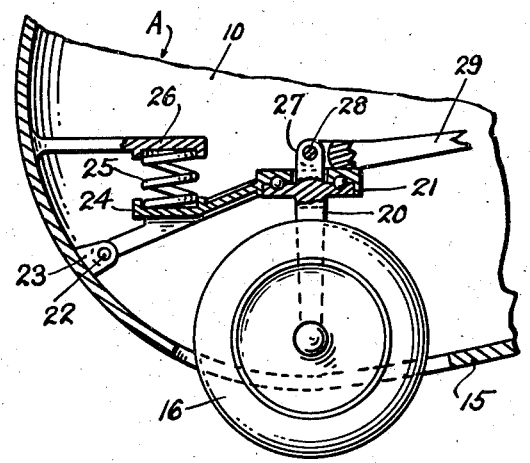
Figure 5 is a fragmentary longitudinal sectional view through the fore end of the vehicle.

Referring to the drawings in detail A designates generally the vehicle in its entirety constructed in accordance with the invention and hereinafter set forth.

The vehicle A comprises a body 10, preferably of horizontal oval and vertical elliptical shape, although it may be of any selected shape or stream-lined, at the option of the builder. The body 10 is provided with side doors 11, and fore and aft paneled windows 12, respectively. The windows may be of the opening and closing type, there being also a rear view window 13, as well as a front windshield-like window 14.

Working through suitable openings in the flooring 15 of the body 10 fore and aft thereof are the front single steering wheel 16, and the double rear driving wheels 17, respectively. The wheels 17 through flexible shafts 18 are connected with hydraulic drivers 18', operated through couplings with rotary motors 19.

The front wheel 116 is fitted in a steering fork 20, which has anti-friction bearing connection with a vertically swingable hanger or hound 21, pivoted at 22 to brackets 23 fixed to the body 10 forwardly of the fork 20. This hanger or hound 21 has a seat 24 for a shock absorber spring 25, under-seated against a bracket 26 fixed to the said body. The steering column 27 of the fork 20 has pivotally connected thereto at 28 a steering handle 29 for guiding the wheel 16 when the vehicle is traveling.

The rear drive wheels 17 have their axles fitted in a rear hanger or hound 30, which is vertically swingable in bearings 31 fixed to the flooring of the vehicle A, and this hanger or hound 30 is acted upon by a shock-absorber spring 32 under-seated against a bracket 33 fixed to and rising from the said floor 15. These wheels 17 are power wheels for the vehicle A.

Working through suitable clearances in the floor 15 at opposite sides of the body 10 of the vehicle A are fore and aft balancing wheels 34 and 35, respectively, being side paired, and such pairs are journaled on vertically swingable axle extensions 36, which project laterally from rocking shafts 37, these being horizontally journaled in bearings 38 fixed to the floor 15 at opposite sides of the keel line of the body 10. The shafts 37 are formed with loop cranks 39, to which are connected throw links 40 which are pivoted to piston stems 41, the pistons 42 thereof being reciprocatingly fitted in fluid cylinders 43, in a single unit, suitably mounted upon the floor 15 of the body 10. These cylinders 43 are communicative with pipes 44 of a fluid supply and exhaust system, which includes a storage fluid tank 45 and a control valve 46, respectively, the latter being of the hand operated type for regulating the supply and exhaust of fluid to and from the cylinders 43, so as to effect the raising and lowering of the balancing wheels 34 and 35, which are adapted for ground contact for effecting the righting of the vehicle A and to maintain the same on an even keel during travel thereof, as well as assuring safety in making curves in its path course. These wheels 34 and 35 enable proper take-off of the vehicle A and when coming to a stand-still or at stand-still.

One of the motors 19 has associated therewith an automatic air compressor 47 which is included in the fluid system, to store fluid in the storage tank 45 by a pipe connection 48 therebetween. The dotted and full line arrows shown in Figure 3 indicating the flow of fluid from and to these various elements, for the operation thereof.

When the vehicle is traveling it runs on the front wheels and the rear driving wheels, respectively, while the balancing wheels 34 and 35 are brought into play, when the occasion requires for the purpose previously mentioned.

The motors 19 may be of any selected type and are the power mediums for the vehicle A.

What is claimed is:

A vehicle of the kind described, comprising a body, a steering wheel fore and at the longitudinal center of the body, a driving wheel aft and at the longitudinal center of said body, a motor within the body and having flexible driving connection with the aft wheel, means for steering the fore wheel, balancing wheels arranged at opposite side of the longitudinal center of said body for raising and lowering movements, mechanism for effecting raising and lowering movements to the balancing wheels comprising vertically swinging axle extensions projecting laterally from and formed integral with parallel rocking shafts horizontally journalled in bearings fixed to the floor of said body at opposite sides of the longitudinal center of the body, loop cranks formed in said shafts, throw links connected to said loop cranks and to pistons reciprocatingly fitted in fluid cylinders mounted on the floor of said body, means for regulating said mechanism, a source of fluid supply for the said mechanism, storage means for the fluid supply, and a compressor included in the fluid supply and operated by the motor.

CARL W. LEACH.